(12) United States Patent
Düppe et al.

(10) Patent No.: US 10,955,968 B2
(45) Date of Patent: Mar. 23, 2021

(54) INPUT SYSTEM AND PROCESS FOR CONTROLLING AN ELECTROMEDICAL DEVICE

(71) Applicant: Drägerwerk AG & Co. KGaA, Lübeck (DE)

(72) Inventors: Christian Düppe, Lübeck (DE); Stefan Schlichting, Lübeck (DE); Maximilian Merkel, Lübeck (DE); Christian Brandt, Lübeck (DE); Andi Kern, Lübeck (DE)

(73) Assignee: Drägerwerk AG & Co. KGaA, Lübeck (DE)

( * ) Notice: Subject to any disclaimer, the term of this patent is extended or adjusted under 35 U.S.C. 154(b) by 0 days.

(21) Appl. No.: 16/893,037

(22) Filed: Jun. 4, 2020

(65) Prior Publication Data
US 2020/0387260 A1    Dec. 10, 2020

(30) Foreign Application Priority Data

Jun. 7, 2019 (DE) .......................... 102019003997.1

(51) Int. Cl.
*G06F 3/041* (2006.01)
*G06F 3/0482* (2013.01)
*G06F 3/0488* (2013.01)

(52) U.S. Cl.
CPC .......... *G06F 3/0418* (2013.01); *G06F 3/0482* (2013.01); *G06F 3/0488* (2013.01)

(58) Field of Classification Search
CPC .. G06F 3/0488; G06F 3/04883; G06F 3/0482; G06F 3/04817; G06F 3/04842; G06F 3/0416; G06F 3/017; G06F 3/0412; G06F 3/0304; G06F 2203/04104; G06F 2203/04808
See application file for complete search history.

(56) References Cited

U.S. PATENT DOCUMENTS

| | | | |
|---|---|---|---|
| 2006/0109138 A1* | 5/2006 | Chiang | G08C 19/28 340/12.29 |
| 2008/0114614 A1 | 5/2008 | Mahesh et al. | |
| 2009/0326389 A1 | 12/2009 | Ralfs | |
| 2011/0069021 A1* | 3/2011 | Hill | G06F 3/04883 345/173 |
| 2012/0133600 A1 | 5/2012 | Marshall et al. | |
| 2012/0154447 A1* | 6/2012 | Kim | G06F 1/1626 345/661 |

(Continued)

*Primary Examiner* — Dong Hui Liang
(74) *Attorney, Agent, or Firm* — McGlew and Tuttle, P.C.

(57) ABSTRACT

A input system (100), controlling an electromedical device (105), includes a network (110), an input unit (120) and a control unit (140). The input unit has a touch display (122) and detects an input area (125) and outputs an input signal (126) to the network via an input interface (128), if a comparison between the input area and a displayed control menu (130) makes possible an assignment, between the input area and the control command, if the input area is located within a command area (132) on the touch display, and if the control command is contained in a group of currently executable control commands. The control unit receives the input signal and outputs a control signal (142), based on the input signal, to the electromedical device for actuating the corresponding application and sends a confirmation signal (144) to the input unit after the output of the control signal.

14 Claims, 5 Drawing Sheets

(56) References Cited

U.S. PATENT DOCUMENTS

2013/0088452 A1    4/2013  Glaser-Seidnitzer et al.
2015/0253986 A1*   9/2015  Nakano ............... G06F 3/04883
                                                              345/173
2017/0155976 A1*   6/2017  Chung ................. H04N 21/472

* cited by examiner

INPUT SYSTEM AND PROCESS FOR CONTROLLING AN ELECTROMEDICAL DEVICE

CROSS REFERENCE TO RELATED APPLICATIONS

This application claims the benefit of priority under 35 U.S.C. § 119 of German Application 10 2019 003 997.1, filed Jun. 7, 2019, the entire contents of which are incorporated herein by reference.

TECHNICAL FIELD

The present invention pertains to an input system for controlling an electromedical device and to a process for controlling an electromedical device. Furthermore, the present invention pertains to a program with a program code for carrying out the process according to the present invention.

TECHNICAL BACKGROUND

Input systems which are connected to an electromedical device and can output control signals to the electromedical device are basically known in the clinical setting. In this case, it is also known that the input system is formed by a touch display, which displays a control menu, so that a control command for the electromedical device is selected by a user by touching the touch display.

US 2009/0326389 A1 describes a system, in which a ventilator and a user interface are connected via a communication network, the user interface having a graphic user surface that is synchronized with a current operating mode of the ventilator.

SUMMARY

An object of the present invention is to provide an improved input system for an electromedical device, in particular an especially reliable input system with an improved, automated detection of incorrect inputs.

An input system for controlling an electromedical device is proposed for accomplishing this object according to the present invention.

The input system comprises here a communication network, an input unit and a control unit.

The input unit has a touch-sensitive touch display and is configured to detect an input area of the user input in the presence of a user input, the input area comprising the area on the touch display, with which a contact between the touch display and the user has taken place during the user input.

The input unit is further configured to output a corresponding input signal to the communication network via an input interface of the input unit if a comparison between the input area and a control menu displayed on the touch display during the user input makes possible an assignment between the input area and a control command, the control menu comprising at least one control command. The input signal is configured here to indicate the assigned control command.

An assignment between the input area and a control command is only possible here if the input area is located entirely within a predefined command area assigned to the control command on the touch display, and if the control command to be assigned during the user input was contained in a group of currently executable control commands, the input unit being configured to receive the group of currently executable control commands as a function of the current operating mode of the electromedical device connected to the communication network. The group of currently executable control commands may be received, for example, from a memory device which is connected to the communication network, or even directly from the connected electromedical device.

The at least one control unit is assigned to the electromedical device and is configured to receive the input signal and to output a control signal as a function of the input signal to the electromedical device for actuating the corresponding application. The control signal preferably depends on the control command indicated by the input signal in this case. The control unit is further configured to send a confirmation signal to the input unit via the communication network after the output of the control signal has been carried out. In this case, the input unit is further configured to display the receipt of a confirmation signal via the touch display and to display an error output via the touch display if a confirmation signal has not been received after a predefined waiting time, which begins with the outputting of the input signal.

It was found within the framework of the present invention that an incorrect input may have adverse consequences for the health of a patient during the operation of electromedical devices, so that an operation due to accidental touching of a touch display should be avoided or at least made difficult. It was further found that the probability of an incorrect input is reduced if only one predefined input area of the touch display may also be touched during the user input for inputting a defined control command.

The input system according to the present invention advantageously makes it possible to avoid incorrect inputs in case of the control of the electromedical device. In particular, the especially high risk of an operating error due to inadvertent touching on a touch display is hereby reduced.

Moreover, the system advantageously detects which control commands are applicable at all during a currently present operating mode of the electromedical device. As a result, an operating error, for example, due to an existing piece of incorrect information in regard to the current operating mode is avoided.

By not being an integral component of the electromedical device, but rather only being connected to this electromedical device via the communication network and via a corresponding control unit, the input system according to the present invention makes it possible, moreover, to control a plurality of electromedical devices via the same input system according to the present invention. For this, the input signal is preferably configured to indicate the electromedical device to be controlled via the input signal or the corresponding control unit connected to the electromedical device.

Moreover, it is especially reliably determined by the input system according to the present invention that the input by the user has actually led to a corresponding control signal at the electromedical device, since the user is explicitly informed about the result of the input by the confirmation signal or by the corresponding error output. The display of the confirmation signal or of the error output is preferably carried out by a graphic element on the displayed control menu.

The at least one control unit may be a part of the electromedical device or even a separate device. In particular, the control signal outputted by the control unit may preferably actuate a corresponding component of the electromedical device directly. Consequently, the confirmation signal especially advantageously provides information directly about a setting of the electromedical device that is not only intended, but has been carried out.

The input unit is according to the present invention a separate device, which can be used to control different electromedical devices via the communication network. The electromedical device can in this case typically be connected to the input unit by means of an integrated control unit. As an alternative or in addition, the control unit may be a device arranged upstream of the electromedical device, which can be used separately from the electromedical device.

The input unit may advantageously comprise a processor module that is configured to detect the input area, to check the assignment between the input area and a control command and to output a corresponding input signal.

The list of conditions for making possible an assignment between input area and control command according to an aspect of the invention is not considered to be complete. Other conditions are also necessary in other embodiments according to the present invention, so that an assignment between input area and control command is possible.

Preferred embodiments of the input system according to the present invention will be described below.

The predefined waiting time until a display of the error output via the touch display is triggered is less than 20 sec, preferably less than 15 sec, especially preferably less than 5 sec in one embodiment according to the present invention.

In one embodiment according to the present invention, the control unit is configured to transmit to the input unit via the communication network the predefined waiting time until the display of the error output via the touch display is triggered. A predefined waiting time for the concrete input signal and/or for the concrete electromedical device can consequently be used by the input unit.

In an especially preferred embodiment, the input unit is configured to output the input signal only if the user input has taken place within a predefined input period before the output of the input signal to be carried out. Consequently, it is advantageously ensured that the input signal is outputted to the user input in a timely manner. In particular, it can be ensured that different user inputs are not processed at the same time, so that an incorrect assignment between the intended user input and the control command is carried out. Furthermore, in case a chronological sequence of user inputs is necessary for the assignment between the input area and a control command, it can be ensured that this chronological sequence must take place within a narrow time interval. An operating error of the correspondingly actuated electromedical device can consequently be avoided. The predefined input period is preferably less than 20 sec, especially preferably less than 5 sec, especially less than 1 sec.

The predefined command area assigned to the control command on the touch display for control commands of a first group of control commands is configured in another advantageous embodiment such that it has a greater area than a corresponding control symbol displayed on the touch display. As a result, it is ensured that the touching of an edge region of the predefined command area on the touch display also leads to an assignable and thus successful user input. This may be advantageous in case of a user input carried out rapidly, as may be necessary in the hectic pace of routine clinical practice. In a preferred variant of this embodiment, the first group of control commands is formed by commands, which have no influence or almost no influence on the health of a patient connected to the electromedical device. A larger, predefined command area deviating from the control symbol may also be advantageous because the shape of the control symbol makes an exact touching of this symbol on the touch display difficult. Thus, for example, a triangular control symbol is more difficult to touch accurately with the finger than a rectangular control symbol.

The predefined command area assigned to the control command on the touch display for the control commands of a second group of control commands is configured in another embodiment such that it has a smaller area than a corresponding control symbol displayed on the touch display. By contrast to the previous embodiment, it is ensured for the control commands of the second group of control commands that the control symbol displayed on the touch display is especially touched centrally, so that an operating error due to inadvertent touching is especially unlikely. This is especially relevant for control commands that have an expected influence on the health of a patient connected to the electromedical device in case of an operating error.

The input unit preferably provides predefined command areas for control commands, which command areas are dimensioned corresponding to their relevance for the patient's health. For this purpose, command areas corresponding to the two last-mentioned embodiments are especially advantageous for control commands of a first group and of a second group of control commands. The input of the relevance for the patient's health may advantageously be carried out by the control unit, which thereby ensures a suitable selection of the predefined command areas.

A plurality of predefined command areas that are separated from each other in space are preferably arranged corresponding to a plurality of currently executable control commands on the touch display. Consequently, a reliable control for each control command can be made possible due to the assignment of the input area and the control command according to the present invention. In this case, a dimensioning of the command area relative to the control symbol displayed on the touch display can have a different configuration for each of the predefined command areas separated in space, for example, corresponding to the relevance of the corresponding control command for the patient's health.

In an especially preferred embodiment, the input unit is further configured to detect a chronological sequence of contact points of the contact between the touch display and the user and to assign the chronological sequence of contact points to the corresponding user input, wherein an assignment between the input area and a control command is further possible only if the result of a comparison between the detected chronological sequence and a predefined motion pattern to be carried out is that the detected chronological sequence corresponds to the motion pattern to be carried out. As a result, an especially reliable operation is guaranteed, since an operating error due to inadvertent touching is almost ruled out. The additional condition for a successful assignment between the input area and a control command corresponding to this embodiment is typically only necessary for a user input with an especially high relevance for the health of a patient connected to the electromedical device. The motion pattern maybe, for example, a change of the contact point from the right to the left or from the left to the right within the predefined command area. The motion pattern to be carried out may, however, also have a multiple change of the contact points within the corresponding command area. Furthermore, the motion pattern to be carried out may have a contact between the touch display and the user, which contact stops for a defined contact time. In this case, the sequence of contact points would always pertain to the same point on the touch display. In another variant of this embodiment, the contact points may only be located at a predefined geometric distance from a center of the contact points so that an assignment is carried out.

In another, especially preferred and advantageous embodiment, the input unit is further configured to trigger a locking of the touch display after a predefined number of user inputs that have not made possible any assignment between the input area and the control command Operating error due to inadvertent touching of the touch display is especially advantageously avoided in this embodiment. In particular, it is avoided that an operating error is made due to a continuous inadvertent contact, for example, due to the leaning of a person or due to the placing of an object on the touch display, since the touch display is locked in this case. Furthermore, the input unit is configured in a variant of this embodiment to detect a user input again after the locking has been carried out only if a predefined manual unlocking process has been carried out at the input unit. The necessary manual unlocking process is especially advantageous in this variant, since it is ensured as a result that no inadvertent unlocking of a locked touch display takes place. The unlocking process may be implemented by the detection of a predefined chronological sequence of contact points on the touch display. As an alternative or in addition, the unlocking process may be implemented by the input of a numerical code. As an alternative or in addition, the unlocking process may be implemented by a manual restart of the input unit.

In an advantageous embodiment, the at least one control unit is further configured to send an error signal to the input unit via the communication network if the control signal was not outputted to the electromedical device and/or if the control signal was not implemented by the electromedical device. In this embodiment, the waiting time until it is determined that the controlling of the electromedical device has not been carried out can advantageously be reduced, since an error output can be carried out via the touch display directly after the receipt of the error signal.

In another embodiment, the input unit is further configured to carry out a calibration process of the touch display after an initial activation of the input unit. The input unit is further configured to carry out the assignment between the input area and a control command based on a result of the calibration process. Due to the calibration of the touch display, it can be ensured that the assignment between the input area and a control command is thus carried out as a user of the input unit expects it. Especially in a plurality of input areas that are located close to each other, a calibration that has not been carried out may lead to an operating error of the input system, which is difficult to correct and possibly difficult to detect by the user.

In another embodiment of the input system, it is further configured to output a checking signal when the confirmation signal has not been received. The checking signal may be outputted to an external device in order to prompt a manual checking of the medical device. In another or additional variant, the checking signal is outputted by the input unit to the control unit to output a corresponding signal to prompt a checking at the electromedical device. The outputting of the checking signal preferably requires a subsequent manual inputting of a piece of corresponding checking information in order to make possible a further control of this electromedical device by the input system. It is ensured as a result that only a manually checked device can be actuated again after the outputting of the checking signal. In another alternative or additional variant of this embodiment, outputting of the checking signal depends on a predefined risk class of the electromedical device to be actuated. As a result, it is ensured that a manual checking of this device must only take place in case of devices with a great influence on the patient's health, as a result of which work time of clinical staff can be saved.

According to another aspect of the present invention, the above-mentioned object is accomplished by a process for controlling an electromedical device.

The process according to the present invention has in this case the following steps:
displaying of a control menu, comprising at least one control command, on a touch display;
detection of an input area of a user input on the touch display, wherein the input area comprises the area on the touch display, with which a contact between the touch display and the user has taken place during the user input;
checking, by means of a comparison of the input area with the control menu displayed on the touch display during the user input, whether an assignment is possible between the input area and a control command, wherein an assignment is only possible between the input area and the control command
if the input area is located entirely within a predefined command area assigned to the control command on the touch display, and
if the control command to be assigned during the user input was contained in a group of currently executable control commands, wherein the group of currently executable control commands is received as a function of a current operating mode of the connected electromedical device,
outputting of a corresponding input signal if the assignment between the input area and a control command is possible;
receipt of the input signal and outputting of a corresponding control signal to the electromedical device for actuating the corresponding application;
sending of a confirmation signal if the outputting of the control signal has been carried out; and
displaying of a receipt of the confirmation signal if the confirmation signal was received, and displaying of an error output if no confirmation signal was received after a predefined waiting time, which begins with the outputting of the input signal.

The process according to the other aspect of the present invention is carried out by the input system according to the present invention. Therefore, this process comprises all of the advantages already described for the input system.

In particular, the process is advantageous in that inadvertent actuation of the electromedical device due to inadvertent touching of the touch display is avoided.

The process according to the present invention can be carried out by a single input unit connected to the electromedical device, which input unit has the corresponding touch display as user interface. In this case, the process according to the present invention advantageously allows the actuation of a plurality of electromedical devices by means of a single input unit.

Preferred embodiments of the process according to the present invention will be described below.

In one embodiment, the process further comprises the steps
locking of the touch display if a predefined number of user inputs has not made possible any assignment between the input area and the control command, and detection of a user input after a locking has been carried out if a predefined manual unlocking process has taken place.

In this embodiment, an operating error of the touch display due to continuous inadvertent pressure can advantageously be avoided. Such an operating error is possible if the touch display is located in a pocket, or if anyone has leaned on this display, or if anyone has placed an object on this display.

In another embodiment, the process further comprises the step of the detection of a chronological sequence of contact points of the contact between the touch display and the user and assignment to the corresponding user input, wherein an assignment between the input area and a control command is, furthermore, only possible if the result of a comparison between the detected chronological sequence and a predefined motion pattern to be carried out is that the detected chronological sequence corresponds to the motion pattern to be carried out by the user.

In this embodiment, an operating error due to inadvertent touching of the touch display is especially unlikely, since the defined motion pattern to be carried out is likely not obtained due to inadvertent touching.

In another embodiment the process according to the present invention comprises the step of sending an error signal if the control signal was not implemented by the electromedical device. Consequently, if it is detected that the control signal cannot be outputted to the electromedical device, an error output is especially rapidly outputted to a user of the process according to the present invention.

Furthermore, the object according to the present invention is accomplished by a program with a program code for carrying out the process according to at least one embodiment of the process corresponding to the other aspect of the present invention when the program code is run on a computer, on a processor or on a programmable hardware component.

The program may be composed of a combination of programs which are run on different devices. Furthermore, the program may also only be configured for carrying out the steps, which are carried out on a defined device within the input system according to the present invention.

The present invention shall now be explained in more detail on the basis of advantageous exemplary embodiments schematically shown in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
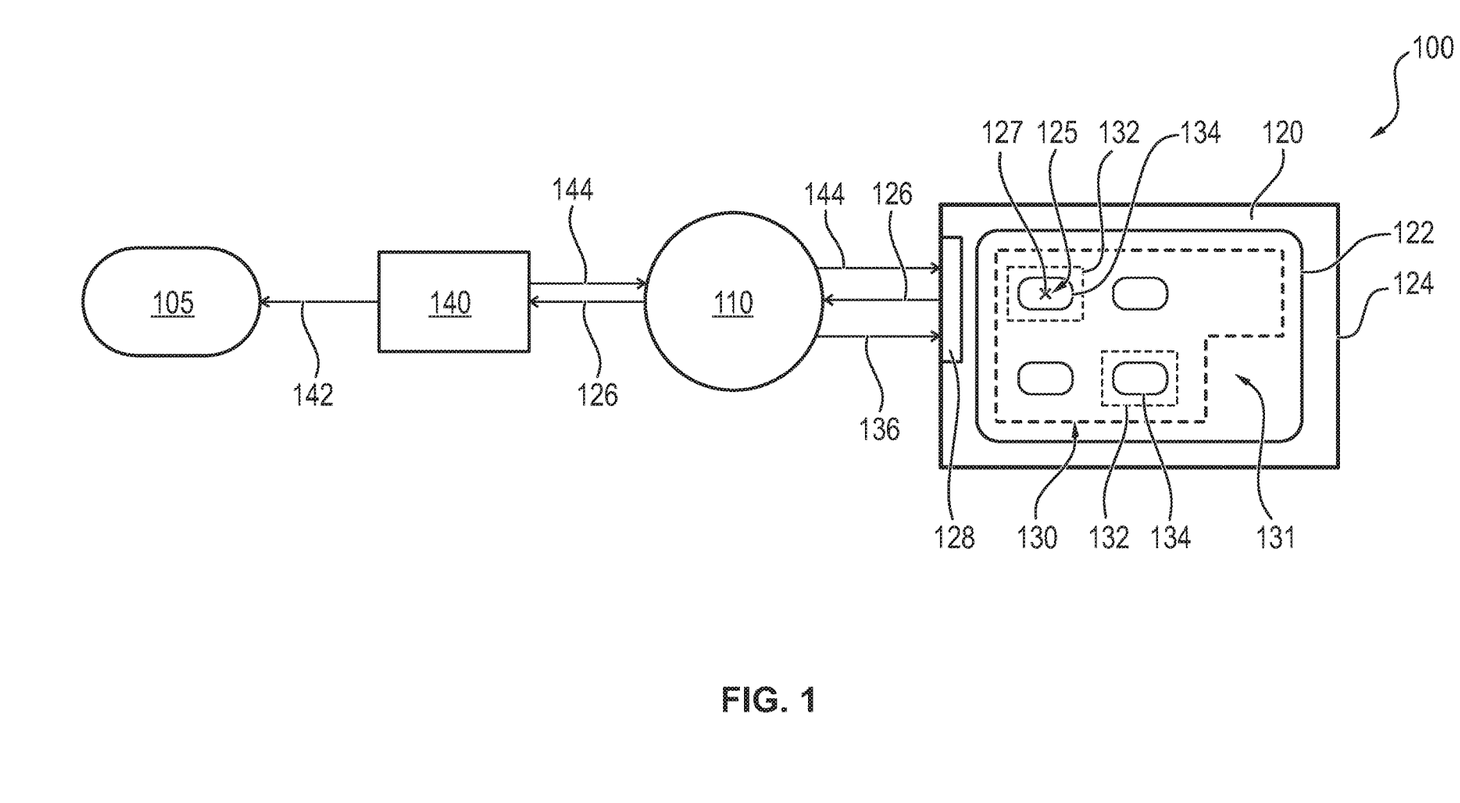
FIG. 1 is a schematic view of a first exemplary embodiment of the input system according to the present invention.

Referring to the drawings, FIG. 1 shows a schematic view of a first exemplary embodiment of the input system 100 according to the present invention.

The input system 100 for controlling an application of the electromedical device 105 comprises a communication network 110, an input unit 120 and a control unit 140.

The input unit 120 has a touch-sensitive touch display 122, a processor (not shown) and a housing 124. In this case, the input unit 120 is configured to detect an input area 125 of the user input in the presence of a user input, wherein the input area 125 comprises the area on the touch display 122, with which a contact has taken place between the touch display 122 and the user during the user input. This user input may trigger a corresponding input signal 126, which is outputted to the communication network 110 via an input interface 128 of the input unit. For this, a comparison between the input area 125 and a control menu 130 displayed on the touch display 122 during the user input must make possible an assignment between the input area 125 and the control command, wherein the control menu 130 comprises at least one control command. The control menu 130 comprises in the exemplary embodiment shown only a part of the surface of the touch display 122, since an output (not shown) not belonging to the control menu 130 takes place in a recessed area 131. This output may have, for example, an input screen, a time, a type name and/or a user name.

An assignment between the input area 125 and the control command is only possible according to the present invention if the input area 125 is located entirely within a predefined command area 132 assigned to the control command on the display 122. In this case, the predefined command area 132 typically corresponds approximately to a corresponding control symbol 134 within the control menu 130. The two schematically shown control symbols 134 may have different configurations. As a result, a user of the input system 100 may optically determine in which area of the control menu 130 the desired control command can be triggered by a corresponding input. The assignment between the input area 125 and the control command according to the present invention is, furthermore, only possible if the control command to be assigned during the user input was contained in a group of currently executable control commands, wherein the input unit is configured to receive the group of currently executable control commands as a function of a current operating mode of the electromedical device 105 connected to the communication network 110. In the present case, the input unit 120 receives a corresponding group signal 136 via the communication network 110 at regular time intervals, which group signal indicates the group of currently executable control commands. The group signal may be, for example, a multicast signal, a unicast signal, a broadcast signal or a response signal triggered by a prompt. In one exemplary embodiment, not shown, such a group signal is outputted directly by the electromedical device to be controlled. Furthermore, the group signal 136 indicates the display of the control menu 130 in the present case. A separate display signal indicates the display of the control menu in one exemplary embodiment, not shown.

The two conditions mentioned in the previous paragraph must at least be met, so that an assignment between the input area 125 and a control command is possible and the input signal 126 is outputted by the input unit 120 as a result.

The at least one control unit 140 is assigned to the electromedical device 105 and is configured to receive the input signal 126 and to output a control signal 142 to the electromedical device 105 as a function of the input signal 126 for actuating the corresponding application. In the exemplary embodiment shown, the control unit 140 is a separate device, which is connected in a cable-based manner to the electromedical device 105. In one exemplary embodiment, not shown, a wireless connection is present. The control unit according to the present invention may also be an integral component of the electromedical device in an exemplary embodiment shown within the framework of FIG. 2.

The control unit 140 is further configured to send a confirmation signal 144 to the input unit 120 via the communication network 110 after the output of the control signal 142 has been carried out. If the control signal 142 was not outputted or cannot be outputted to the electromedical device 105, the control unit 140 is further configured to send an error signal (not shown) to the input unit 120 via the communication network 110. One reason for the non-outputting of the control signal 142 may be a brief change of the current operating mode of the electromedical device 105, for example, the activation of an alarm mode or a defect of the electromedical device. Furthermore, according to the present invention an additional control signal can be sent via the communication network 110 from an external device to the control unit 140 to actuate the electromedical device 105, as a result of which an outputting of the control signal 142 was possibly also prevented.

The input unit 120 is further configured to display the receipt of the confirmation signal 144 via the touch display 122 and to display an error output via the touch display 122 when the confirmation signal 144 has not been received after a predefined waiting time, which begins with the outputting of the input signal 126. In the exemplary embodiment shown, this predefined waiting time is less than 20 sec, preferably less than 15 sec, and especially preferably less than 10 sec. The predefined waiting time is transmitted from the control unit to the input unit in one exemplary embodiment, not shown, and was preferably predefined as a function of the actuated electromedical device. In the present exemplary embodiment, the error output was carried out by an optically detectable symbol within the control menu 130, especially by a red shading and/or border of the symbol 134 corresponding to the control command, and/or by the display of a separate symbol on the touch display 122. If the input unit 120 receives the error signal from the control unit 140, an additional error output is carried out via the touch display 122. In the present case, the user can see as a result that the displayed error was not generated because of the exceeding of time, but rather due to the receipt of the error signal. Such a differentiation may contribute to a faster detection of the present error as a function of the electromedical device to be controlled.

In addition to the two above-mentioned conditions that must be met so that an assignment between the input area 125 and the control command is possible in the exemplary embodiment shown, the input unit 120 is configured to output the input signal 126 only if the user input has taken place within a predefined input period before the output of the input signal 126 to be carried out. This predefined input period is preferably less than 20 sec, especially preferably less than 5 sec, and especially less than 1 sec in the present case.

The communication network 110 may, in principle, be connected to a plurality of input units and also to a plurality of control units independently thereof. In particular, the control of a plurality of electromedical devices can be made possible due to the connection of the input unit 120 to the communication network 110, as this is described within the framework of FIG. 2.

As shown in FIG. 1, control symbols 134, of which two control commands corresponding to these control symbols 134 are currently executable, are displayed in the control menu 130. In FIG. 1, this is characterized by the two correspondingly assigned, predefined command areas 132, wherein the command areas are typically not visible for a user. In one exemplary embodiment, not shown, however, the currently existing predefined command areas are also outputted in an optically visible manner for a user. A user of the input unit 120 may typically also recognize on the touch display 122, for example, due to the colors used for the control symbols 134, which corresponding control commands are currently executable on the display of the control menu 130. The command areas 132 correspond in this case essentially to the respective control symbol 134, wherein they have a somewhat greater area than the corresponding control symbol 134 displayed on the touch display 122. The input area 125 consists of a single contact point 127 shown by an X in the exemplary embodiment shown. Consequently, an input, to which a control command can be assigned, was carried out by the user, since the input area 125 is located within the corresponding command area 132. Corresponding to this control command, the input signal 126 was therefore triggered and received by the control unit 140.

Figure 2:
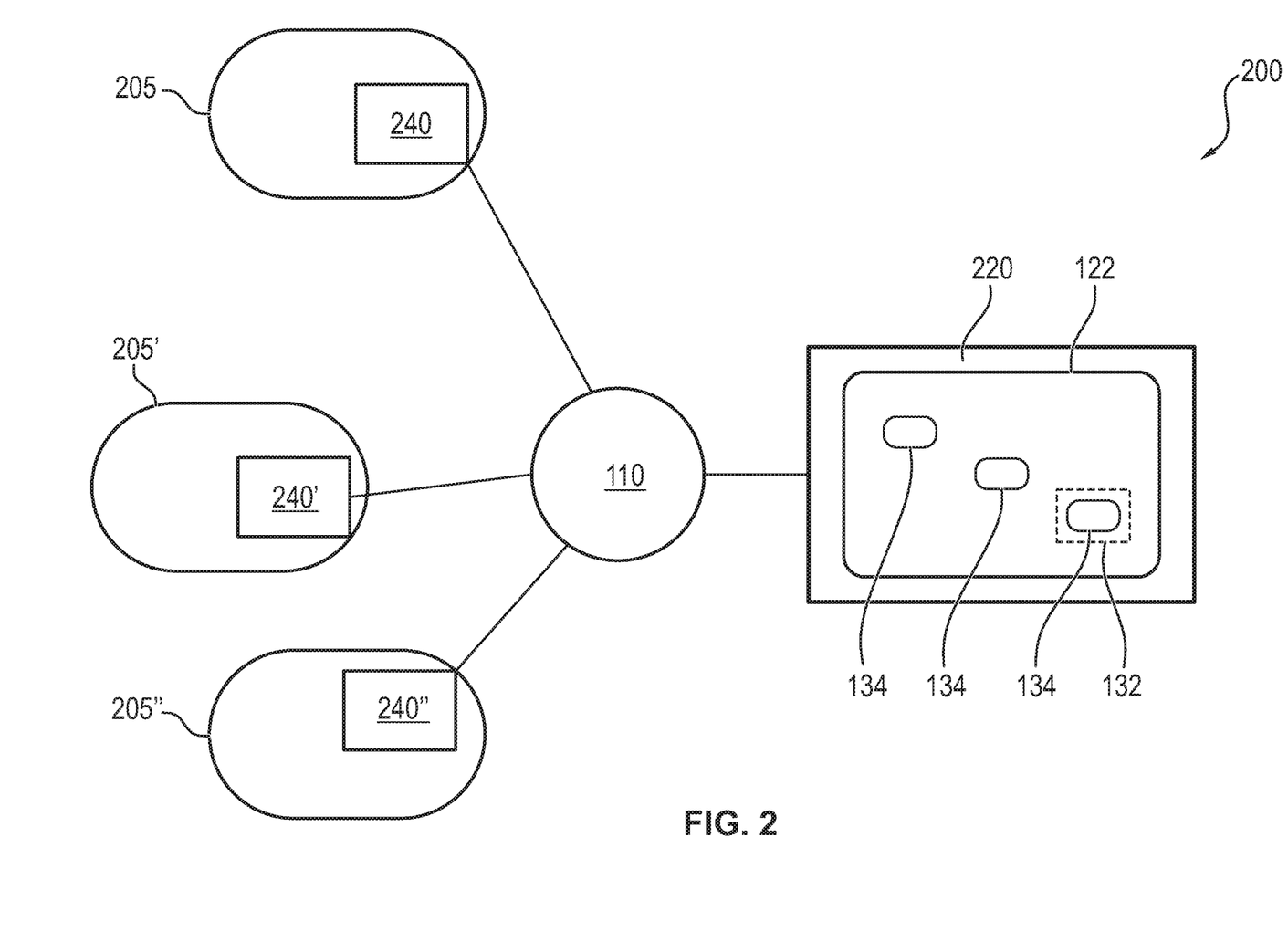
FIG. 2 is a schematic view of a second exemplary embodiment of the input system according to the present invention.

FIG. 2 shows a schematic view of a second exemplary embodiment of the input system 200 according to the present invention.

The input system 200 differs from the input system 100 shown in FIG. 1 by the control unit 240, 240', 240" being an integral component of an actuatable electromedical device 205, 205', 205", respectively. Furthermore, the input system 200 comprises three control units 240, 240', 240" which are connected to the input unit 220 via the communication network 110.

The touch display 122 of the input unit 220 displays a control menu 230, which is dependent both on the electromedical device 205 to be currently actuated and on the current operating mode of this electromedical device 205. In the present case, three control symbols 134 are displayed, wherein a currently executable control command is assigned to only one of these control symbols 134 and a predefined command area 132 is therefore assigned to only this one control symbol 134, which command area would have to be touched for a corresponding control.

In one exemplary embodiment, not shown, the communication network is connected both to control units that are integral components of a corresponding assigned electromedical device and connected to a number of control units which represent a separate device, which is assigned to a corresponding electromedical device, as shown in FIG. 1.

The exemplary embodiment shown illustrates the advantage of the input system according to the present invention that the input unit 220 can be used for different electromedical devices and this is also possible for a single input unit at the same time. In addition to the control menu 230 shown in a corresponding area of the touch display 122, the touch display 122 preferably also displays measured values of the electromedical device, for example, vital parameters, in order to provide a basis for decision-making for the control to be carried out for a user of the input system 200. Such an area for measured values may be integrated into the control menu 230 or provided as a separate area.

After a predefined number of user inputs, which had not led to an input signal, since no assignment between the input area and a control command was possible, the input unit 220 is further configured to lock the touch display 122 for additional inputs of a user. After such a locking, the detection of a user input is again only possible if a predefined manual unlocking process has taken place at the input unit 220. An unlocking is carried out by the input of a predefined combination of numbers in the present case. In one exemplary embodiment, not shown, an unlocking is carried out by the input of an unlocking pattern. In another exemplary embodiment, not shown, the unlocking is carried out by a manual restart of the input unit.

In addition, the input unit 220 is configured to carry out a calibration process of the touch display 122 after an initial activation. The assignment between the input area and the control command necessary in the ongoing operation is then based on a result of this calibration process. As a result, an especially error-free operation of the touch display 122 by the user is made possible.

Figure 3:
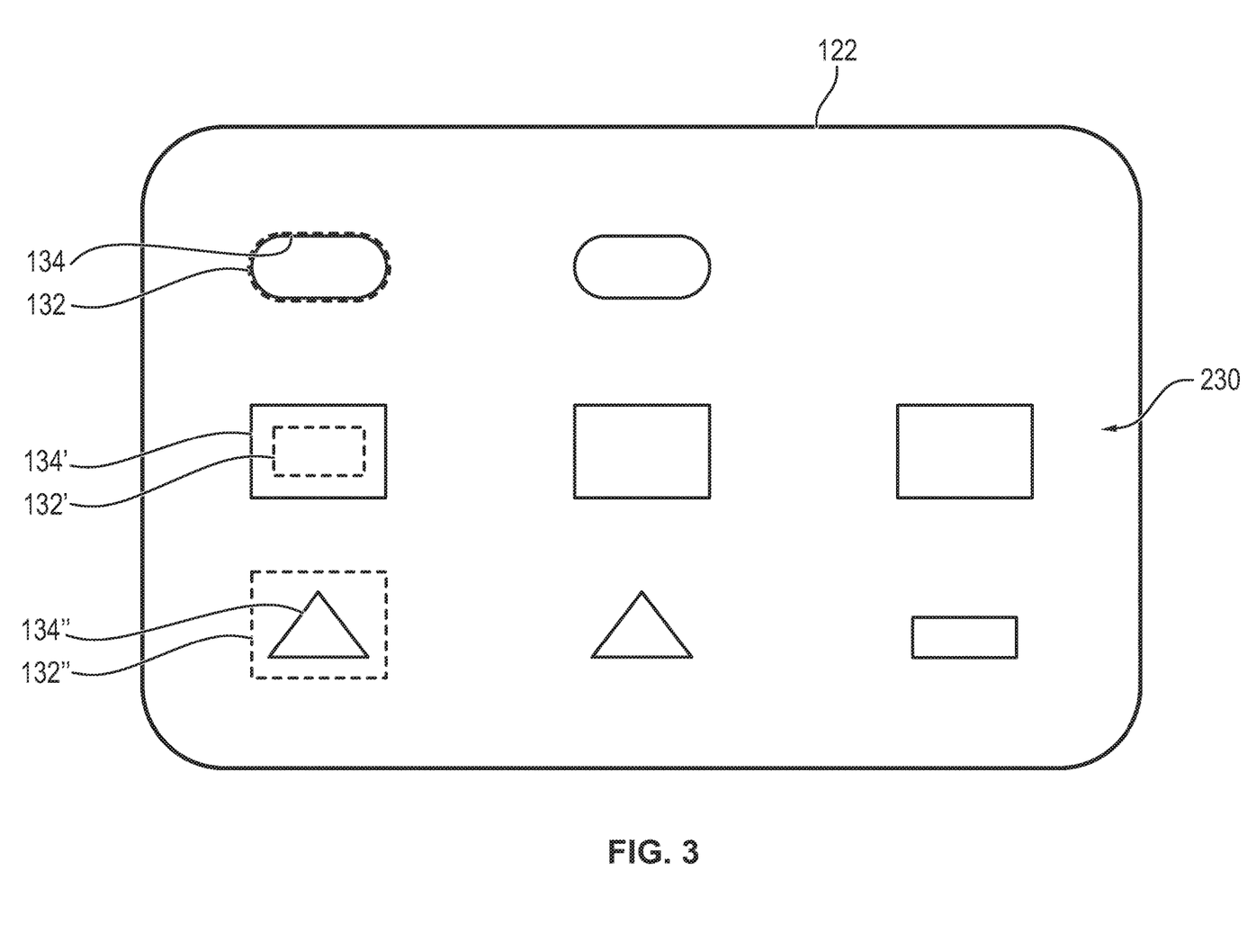
FIG. 3 is a schematic view of a control menu of the second exemplary embodiment of the input system according to the present invention.

FIG. 3 shows a schematic view of the control menu 230 of the second exemplary embodiment of the input system 200 according to the present invention.

The control menu 230 comprises eight control symbols 134, 134', 134", which are arranged on an operating surface of the touch display 122, for the operating mode shown, which differs from the operating mode shown in FIG. 2. However, currently executable control commands are assigned only to the three control symbols 134, 134', 134" that are arranged on the left of these eight control symbols 134, 134', 134", so that only these control symbols 134, 134', 134" have an assigned predefined command area 132, 132', 132", via which a control command can be inputted by a contact within the framework of a user input. Should a different area of the touch display 122 outside of the predefined command areas 132, 132', 132" be touched by the user, this would not lead to an assignment between the input area and the control command and would lead to a locking of the touch display 122 in case of a repeated incorrect input. In this case, a repeated incorrect input with subsequent locking is present after three user inputs without an assignment being carried out between the input area and the control command. In one exemplary embodiment, not shown, a locking will be carried out after five user inputs without such an assignment and will be carried out already after an input without an assignment being carried out.

The top predefined command area 132 corresponds in its area approximately to the corresponding control symbol 134 shown on the touch display 122.

The central predefined command area 132' is configured such that it has a smaller area than the corresponding control symbol 134' shown on the touch display 122. As a result, it is ensured that a corresponding control command is only triggered if the user actually wanted to touch the corresponding control symbol 134', and has not caused a contact with an edge area of this control symbol 134' only accidentally, for example, by touching a different button. Such a smaller predefined command area 132' is especially advantageous if the corresponding control command may have a great influence on the state of health of the patient connected to the correspondingly actuated electromedical device.

The bottom predefined command area 132" is configured such that it has a greater area than the corresponding control symbol 134" displayed on the touch display 122. In the present case, such a large command area 132" is advantageous since the control symbol 134" has the shape of a triangle and therefore is more difficult to touch in its inner area than, for example, a rectangle shape in case of the user input. Furthermore, such a large command area 132" is advantageous for inputs, which have to be carried out frequently and/or repeatedly, so that the user possibly touches an edge area of the control symbol 134" due to carelessness. Such a large predefined command area is preferably present if the control command corresponding thereto may have no direct influence on the state of health of the patient connected to the correspondingly actuated electromedical device.

The respective command area for a control command can preferably be preset, adapted and/or changed by a user of the input system.

Figure 4:
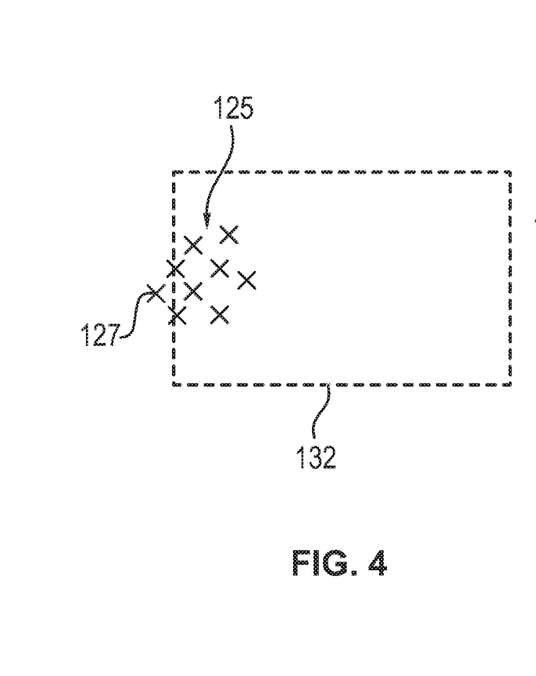
FIG. 4 is a view of one of different user inputs for a predefined command area of the input unit according to the present invention, wherein the input area is not entirely located in the predefined command area.
Figure 5:
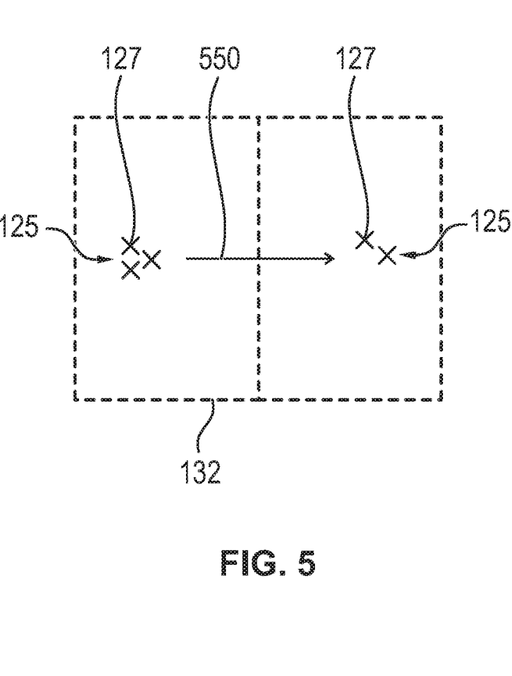
FIG. 5 is a view of one of different user inputs for a predefined command area of the input unit according to the present invention, wherein a chronological sequence of contact points is detected for a left-right touch sequence.
Figure 6:
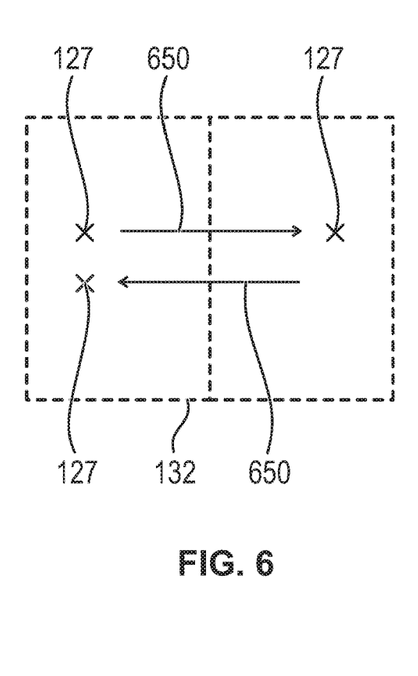
FIG. 6 is a view of one of different user inputs for a predefined command area of the input unit according to the present invention, wherein a left-right-left touch sequence as a predefined motion pattern to be carried out.

FIGS. 4, 5 and 6 show three different user inputs for a predefined command area of the input unit 220 according to the present invention shown in FIG. 2.

FIG. 4 shows a user input, in which the input area 125 is not located entirely in the predefined command area 132. As it is usual during the input by touching the touch display with a finger, a plurality of contact points 127, which form the corresponding input area 125, have been detected. Since an individual contact point is located outside of the predefined command area 132, and this contact point was touched within a predefined input period before the output of the input signal to be carried out, the input carried out is in the form of the input area 125 not entirely within the predefined command area 132 assigned to the control command on the touch display. Hence, no assignment between the input area and a control command is possible in the exemplary embodiment shown in FIG. 4 of an input of a user and a corresponding input signal is not outputted to actuate an electromedical device.

After such an assignment between the input area and a control command not having been carried out, it is typically necessary to wait for a waiting time, especially a waiting time of at least a half second before a user input can be detected by the input unit.

FIG. 5 shows a chronological sequence of contact points 127, wherein first the contact points in the left half of the predefined command area 132 and then the contact points in the right half of the predefined command area 132 are touched. An intermediate area, in which no contact point may be located for a successful assignment, is formed between the left and right halves of the predefined command area in one exemplary embodiment, not shown. In this exemplary embodiment shown, a comparison between the detected chronological sequence and a predefined motion pattern to be carried out is necessary as an additional condition for the assignment between the input area 125 and the control command An assignment between the input area and the control command can be carried out and a corresponding input signal can be outputted only if the detected chronological sequence corresponds to the motion pattern to be carried out. In the present case, the predefined motion pattern to be carried out is a left-right touch sequence 550.

In the exemplary embodiment shown, this motion pattern is achieved by touching the predefined command area 132 multiple times, namely twice. As an alternative or in addition, this motion pattern can be achieved by pushing the finger from left to right without removing it from the touch display.

FIG. 6 shows another chronological sequence of contact points 127, wherein first a contact point in the left half of the predefined command area 132 was touched and then a contact point in the right half of the predefined command area 132 and finally a contact point in the left half of the predefined command area 132. In the present case, the predefined motion pattern to be carried out is hence a left-right-left touch sequence 650. In exemplary embodiments, not shown, other motion patterns to be carried out are predefined, for example, carrying out a cross motion, carrying out a zigzag motion, swiping from top to bottom, or from bottom to top, or from left to right, or from right to left, or any other motion that can be carried out rapidly.

Figure 7:
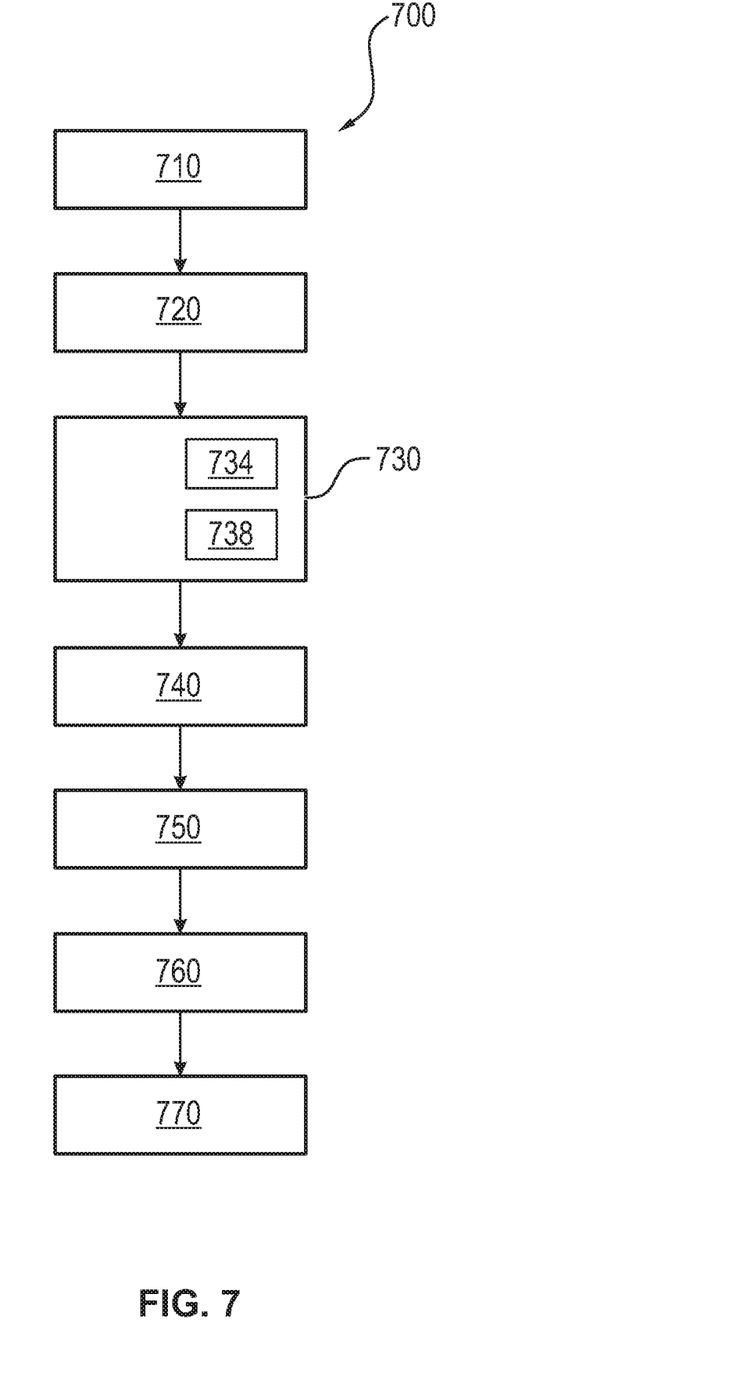
FIG. 7 is a flow chart of a first exemplary embodiment of a process according to the other aspect of the present invention.

FIG. 7 shows a flow chart of a first exemplary embodiment of a process 700 according to the other aspect of the present invention.

The process 700 according to the present invention for controlling an application of an electromedical device has the steps explained below.

A first step 710 comprises the display of a control menu, having at least one control command, on a touch display.

Another step 720 comprises the detection of an input area of a user input on the touch display, wherein the input area comprises the area on the touch display, with which a contact between the touch display and the user has taken place during the user input.

A next step 730 comprises the checking, by a comparison of the input area with the control menu displayed on the touch display during the user input, whether an assignment between the input area and a control command is possible. Such an assignment between the input area and the control command is, however, only possible if at least the two following conditions are met.

According to a first condition 734, the input area must be located entirely within a predefined command area assigned to the control command on the touch display.

According to a second condition 738, the control command to be assigned during the user input must be contained in a group of currently executable control commands, wherein the group of currently executable control commands is received as a function of a current operating mode of the connected electromedical device.

A next step 740 of the process according to the present invention comprises the outputting of a corresponding input signal if the assignment between the input area and a control command is possible.

Another step 750 comprises the receipt of the input signal and the outputting of a corresponding control signal at the electromedical device for actuating the corresponding application.

A next step 760 comprises the sending of a confirmation signal if the outputting of the control signal has been carried out.

A final step 770 comprises the display of a receipt of the confirmation signal if the confirmation signal was received, and the display of an error output if no confirmation signal was received after a predefined waiting time, which begins with the outputting of the input signal.

The process steps 720 through 770 are carried out anew for each user input, wherein the process steps 740 through 770 are carried out only if an assignment between the input area and the control command was possible. For this, according to the present invention, in addition to the conditions 734 and 738, other conditions may also be provided. Corresponding exemplary embodiments of other conditions were already described above.

Step 710 is typically carried out at regular time intervals. Consequently, the control menu can be adapted to current changes of the operating mode of the electromedical device currently to be actuated. A change of such an operating mode typically leads to a change of the control menu. In one exemplary embodiment, not shown, of a process according to the present invention, the actuation of the electromedical device is selected in a first step. As a function of this selection of the electromedical device, the control menu is then displayed on the touch display. Consequently, the process according to the present invention allows the controlling of different electromedical devices via a single touch display.

While specific embodiments of the invention have been shown and described in detail to illustrate the application of the principles of the invention, it will be understood that the invention may be embodied otherwise without departing from such principles.

LIST OF REFERENCE NUMBERS

100, 200 Input system
105, 205, 205', 205" Electromedical device
110 Communication network
120, 220 Input unit
122 Touch display
124 Housing
125 Input area
126 Input signal
127 Contact point
128 Input interface
130, 230 Control menu
131 Recessed area
132, 132', 132" Predefined command area
134, 134', 134" Control symbol
136 Group signal
140, 240, 240', 240" Control unit
142 Control signal
144 Confirmation signal
550 Left-right touch sequence
650 Left-right-left touch sequence
700 Process
710, 720, 730, 740, 750, 760, 770 Process steps
734, 738 Condition

What is claimed is:

1. An input system for controlling an electromedical device, the input system comprising:
 a communication network;
 an input unit comprising an input interface and a touch-sensitive touch display configured to detect an input area of a user input, in the presence of a user input, wherein the input area comprises the area on the touch display, with which a contact between the touch display and the user has taken place during the user input, and wherein the input unit is configured to output a corresponding input signal to the communication network via the input interface in case a comparison between the input area and a control menu displayed on the touch display during the user input makes possible an assignment between the input area and a control command, wherein the control menu comprises at least the control command, and wherein an assignment between the input area and the control command is only possible:
  if the input area is located entirely within a predefined command area assigned to the control command on the touch display; and
  if the control command to be assigned during the user input was contained in a group of currently executable control commands, wherein the input unit is configured to receive the group of currently executable control commands as a function of a current operating mode of the electromedical device connected to the communication network;
at least one control unit assigned to the electromedical device and configured to receive the input signal and to output a control signal as a function of the input signal to the electromedical device for actuating a corresponding application, and wherein the control unit is further configured to send a confirmation signal to the input unit via the communication network after the control signal has been output, wherein the input unit is further configured to display the receipt of a confirmation signal via the touch display and to display an error output via the touch display in case a confirmation signal has not been received after a predefined waiting time, which begins with the outputting of the input signal.

2. An input system in accordance with claim 1, wherein the predefined command area assigned to the control command on the touch display for control commands of a first group of control commands is configured such that the predefined command area has a greater area than a corresponding control symbol displayed on the touch display.

3. An input system in accordance with claim 2, wherein the predefined command area assigned to the control command on the touch display for control commands of a second group of control commands is configured such that it has a smaller area than a corresponding control symbol displayed on the touch display.

4. An input system in accordance with claim 1, wherein the input unit is configured to output the input signal only if the user input has taken place within a predefined input period before the output of the input signal to be carried out.

5. An input system in accordance with claim 1, wherein:
  the input unit is further configured to detect a chronological sequence of contact points of the contact between the touch display and the user and to assign the chronological sequence of contact points to the corresponding user input; and
  an assignment between the input area and the control command is possible only if a result of a comparison between the detected chronological sequence and a predefined motion pattern to be carried out is such that the detected chronological sequence corresponds to the motion pattern to be carried out.

6. An input system in accordance with claim 1, wherein:
  the input unit is further configured to trigger a locking of the touch display after a predefined number of user inputs that have not made possible any assignment between the input area and a control command; and
  the input unit is further configured to detect a user input after the locking has been carried out again only if a predefined manual unlocking process has taken place at the input unit.

7. An input system in accordance with claim 1, wherein the at least one control unit is further configured to send an error signal to the input unit via the communication network if the control signal was not implemented by the electromedical device.

8. An input system in accordance with claim 1, wherein:
  the input unit is further configured to carry out a calibration process of the touch display after an initial activation of the input unit; and
  the input unit is further configured to carry out the assignment between the input area and a control command based on a result of the calibration process.

9. A process for controlling an electromedical device, the process comprising the steps of:
  displaying a control menu comprising at least one control command, on a touch display;
  detecting an input area of a user input on the touch display, wherein the input area comprises the area on the touch display, with which a contact between the touch display and the user has taken place during the user input;
  checking, by means of a comparison of the input area with the control menu displayed on the touch display during the user input, whether an assignment is possible between the input area and a control command, wherein an assignment is only possible between the input area and the control command:
    if the input area is located entirely within a predefined command area assigned to the control command on the touch display, and
    if the control command to be assigned during the user input was contained in a group of currently executable control commands, wherein the group of currently executable control commands is received as a function of the current operating mode of the connected electromedical device;
  outputting of a corresponding input signal if the assignment between the input area and a control command is possible;
  receiving the input signal and outputting a corresponding control signal to the electromedical device for actuating a corresponding application;
  sending a confirmation signal if the outputting of the control signal has been carried out; and
  displaying a receipt of the confirmation signal if the confirmation signal was received, and displaying an error output if no confirmation signal was received after a predefined waiting time, which begins with the outputting of the input signal.

10. A process in accordance with claim 9, further comprising the steps of:
  locking the touch display if a predefined number of user inputs has not made possible any assignment between the input area and the control command; and
  detecting a user input after a locking has been carried out if a predefined manual unlocking process has taken place.

11. A process in accordance with claim 9, further comprising the steps of:
  detecting a chronological sequence of contact points of the contact between the touch display and the user and assignment to the corresponding user input, wherein an assignment between the input area and the control command is, furthermore, only possible if the result of a comparison between the detected chronological sequence and a predefined motion pattern to be carried out is such that the detected chronological sequence corresponds to the motion pattern to be carried out.

12. A process in accordance with claim 9, further comprising the step of sending an error signal if the control signal was not implemented by the electromedical device.

13. A process according to claim 9, wherein a program with a program code for carries out at least some of the process steps with the program code run on a computer, on a processor or on a programmable hardware component.

14. A non-transitory computer-readable medium, having one or more programs stored thereon, the one or more programs including instructions which when executed by one or more processors cause the one or more processors to perform a process for controlling an electromedical device, the process comprising the steps of:
- displaying a control menu comprising at least one control command, on a touch display;
- detecting an input area of a user input on the touch display, wherein the input area comprises the area on the touch display, with which a contact between the touch display and the user has taken place during the user input;
- checking, by means of a comparison of the input area with the control menu displayed on the touch display during the user input, whether an assignment is possible between the input area and a control command, wherein an assignment is only possible between the input area and the control command:
  - if the input area is located entirely within a predefined command area assigned to the control command on the touch display, and
  - if the control command to be assigned during the user input was contained in a group of currently executable control commands, wherein the group of currently executable control commands is received as a function of the current operating mode of the connected electromedical device;
- outputting of a corresponding input signal if the assignment between the input area and a control command is possible;
- receiving the input signal and outputting a corresponding control signal to the electromedical device for actuating a corresponding application;
- sending a confirmation signal if the outputting of the control signal has been carried out; and
- displaying a receipt of the confirmation signal if the confirmation signal was received, and displaying an error output if no confirmation signal was received after a predefined waiting time, which begins with the outputting of the input signal.

* * * * *